(12) United States Patent
Ohta

(10) Patent No.: US 6,208,238 B1
(45) Date of Patent: Mar. 27, 2001

(54) ELECTROMAGNETIC SOUND GENERATING BODY

(75) Inventor: Yoshizumi Ohta, Fujiyoshida (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 09/442,275

(22) Filed: Nov. 17, 1999

(30) Foreign Application Priority Data

Nov. 17, 1998 (JP) .................................................. 10-326513

(51) Int. Cl.[7] ...................................................... G08B 3/00
(52) U.S. Cl. ..................................... 340/391.1; 340/407.1; 340/384.1; 340/311.1; 340/825.46; 381/396; 310/71; 455/349
(58) Field of Search .............................. 340/391.1, 407.1, 340/384.1, 384.73, 388.1, 311.1, 825.46; 381/396, 410; 310/71, 81; 455/348, 347, 349

(56) References Cited

U.S. PATENT DOCUMENTS

| | | | |
|---|---|---|---|
| 5,107,155 | * | 4/1992 | Yamaguchi ........................ 340/311.1 |
| 5,353,017 | * | 10/1994 | Suzuki et al. .................... 340/825.46 |
| 5,619,181 | * | 4/1997 | Murray .............................. 340/407.1 |
| 5,668,423 | * | 9/1997 | You et al. ......................... 340/407.1 |
| 5,861,686 | * | 1/1999 | Lee ......................................... 310/36 |
| 5,894,263 | * | 4/1999 | Shimakawa et al. ............. 340/384.1 |
| 5,971,775 | * | 10/1999 | Tor et al. ............................... 439/79 |
| 5,986,367 | * | 11/1999 | Tsuzaki et al. ................... 340/407.1 |

\* cited by examiner

Primary Examiner—Nina Tong
(74) Attorney, Agent, or Firm—Browdy and Neimark

(57) ABSTRACT

An electromagnetic sound generating body composed of: a sound generator; a casing having an upper case and a lower case combined together, the casing incorporating the sound generator; a sound release hole formed in the casing; and connector terminals projecting from the casing. Because the electromagnetic sound generating body can be electrically connected to the printed circuit board simply by inserting the connector terminals tin the external terminals, there is no need to surface-mount the electromagnetic sound generating body onto the printed circuit board. Therefore, vibrations of the electromagnetic sound generating body do no produce noise in the electronic components and circuits mounted on the printed circuit board. Because the casing is attached with an adhesive member in advance and then secured to the exterior case by the adhesive member, the positional alignment between the sound release hole of the casing and the external sound release hole of the exterior case can be performed easily and reliably, thus preventing an incoming call indicator tone from being trapped inside the exterior case.

2 Claims, 7 Drawing Sheets

ELECTROMAGNETIC SOUND GENERATING BODY

BACKGROUND OF THE INVENTION

1. Field of the Invention

The present invention relates to an electromagnetic sound generating body incorporated in mobile communications devices, such as cellular phones and pagers, that generates an incoming call indicator tone when the device receives an incoming call.

2. Description of the Related Art

A known example of the conventional electromagnetic sound generating body of this kind is a buzzer 1 which is thin and has a vibratory sound generating unit (not shown) incorporated in a rectangular parallelepiped resin casing 2 shown in FIGS. 1 and 2. The buzzer 1 is surface-mounted on a printed circuit board 4 and incorporated in a exterior case 3 of, for example, a cellular phone. The casing 2 has a sound release hole 5 formed in the front side thereof, which is arranged coaxial with an external sound release hole 6 formed in the exterior case 3. To prevent the incoming call indicator tone released from the sound release hole 5 of the buzzer 1 from becoming trapped inside the exterior case 3, a sound leakage prevention packing 7 is provided in a gap between the sound release hole 5 and the external sound release hole 6 of the exterior case 3.

In the conventional buzzer 1, however, because external connection terminals 8 are formed at four corners of the casing 2 and directly soldered to the wiring pattern on the printed circuit board 4, vibrations of the buzzer 1 propagate to other electronic components and circuits mounted on the printed circuit board 4, producing noise in these electronic circuits and components.

Further, because the buzzer 1 is surface-mounted on the printed circuit board 4, if the printed circuit board 4 is deviated from the correct mounting position when assembled into the exterior case 3 of a cellular phone, the sound release hole 5 of the casing 2 fails to align coaxially with the external sound release hole 6 of the exterior case 3, resulting in the incoming call indicator tone being trapped inside the exterior case 3.

SUMMARY OF THE INVENTION

A primary object of the present invention is to provide an electromagnetic sound generating body which prevents vibrations of the electromagnetic sound generating body from producing noise in electronic components and circuits mounted on a printed circuit board.

A second object of the present invention is to provide an electromagnetic sound generating body which, when the electromagnetic sound generating body is assembled, allows the sound release hole of the casing and the external sound release hole of the exterior case to be aligned in position easily and reliably, thereby preventing an incoming call indicator tone from being trapped inside the exterior case.

To achieve the above objectives, an electromagnetic sound generating body according to the invention comprises: a sound generator; a thin casing having an upper case and a lower case combined together, the casing incorporating the sound generator; a sound release hole formed in the casing; connector terminals insert-molded in said lower case when said lower case is molded; wherein the connector terminals are projecting from the casing and have cylindrical insertion portions formed at their front ends for connection with external terminals, and the cylindrical insertion portions are each formed with a slit along an axis of the cylinder; and base portions of the connector terminals for connection with a coil, which comprises the sound generator, are exposed to an interior of the lower case during the insert molding of the connector terminals.

With this construction, because the electromagnetic sound generating body can be electrically connected to the printed circuit board simply by inserting the connector terminals projecting from the casing into the external terminals, there is no need to surface-mount the electromagnetic sound generating body onto the printed circuit board. Therefore, vibrations of the electromagnetic sound generating body can be prevented from propagating to the printed circuit board and producing noise in the electronic components and circuits mounted on the printed circuit board.

Further, because the connector terminals have the cylindrical insertion portions at their front ends which are each formed with a slit, the insertion portions when inserted into the external terminals are deformed elastically so that they do not come off easily, thus assuring reliable electrical connection.

Further, because the connector terminals are insert-molded into the lower case and the base portions of the connector terminals are exposed to the inside of the lower case, the connector terminals can easily be attached to the casing and the connection between the base portions of the connector terminals and the coil forming the sound generator can be made easily.

Further, with this invention, because the electromagnetic sound generating body is directly attached to the exterior case, the alignment between the external sound release hole of the exterior case and the sound release hole of the electromagnetic sound generating body can be done easily, thus preventing the output sound generated by the electromagnetic sound generating body from being trapped inside the exterior case.

These features and advantages will be described in more detail by referring to the accompanying drawings.

DESCRIPTION OF THE PREFERRED EMBODIMENT

Figure 1:
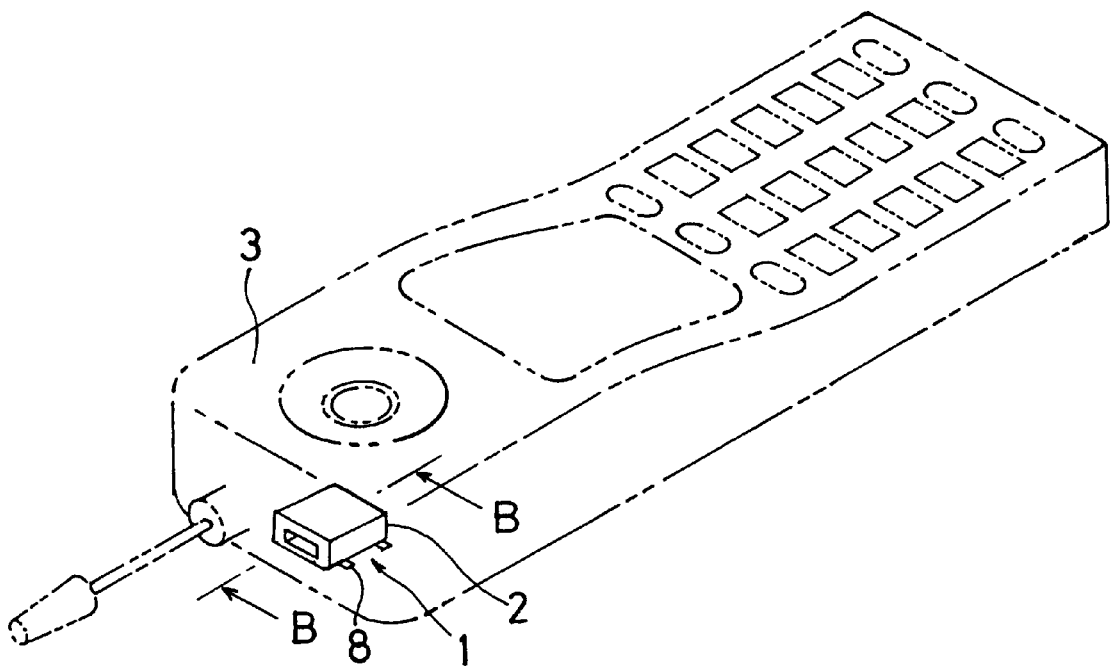
FIG. 1 is a conceptual view of a conventional electromagnetic sound generating body incorporated in a case of a cellular phone.
Figure 2:
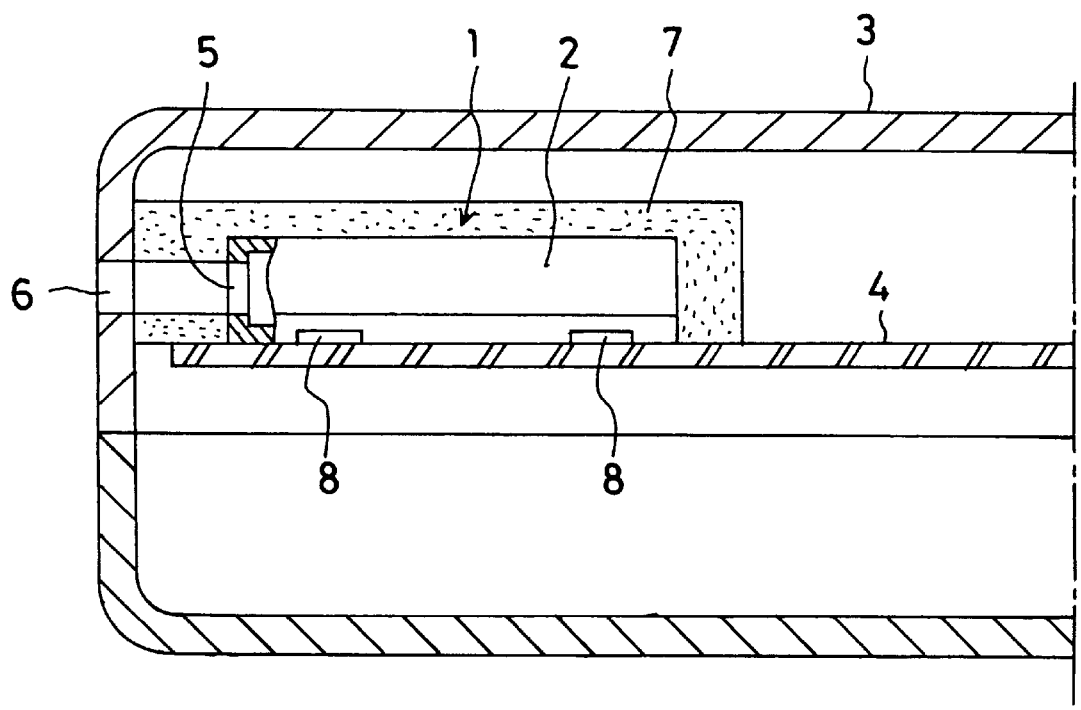
FIG. 2 is a cross section taken along the line B—B of FIG. 1, showing the structure of the conventional electromagnetic sound generating body surface-mounted on a printed circuit board.
Figure 3:
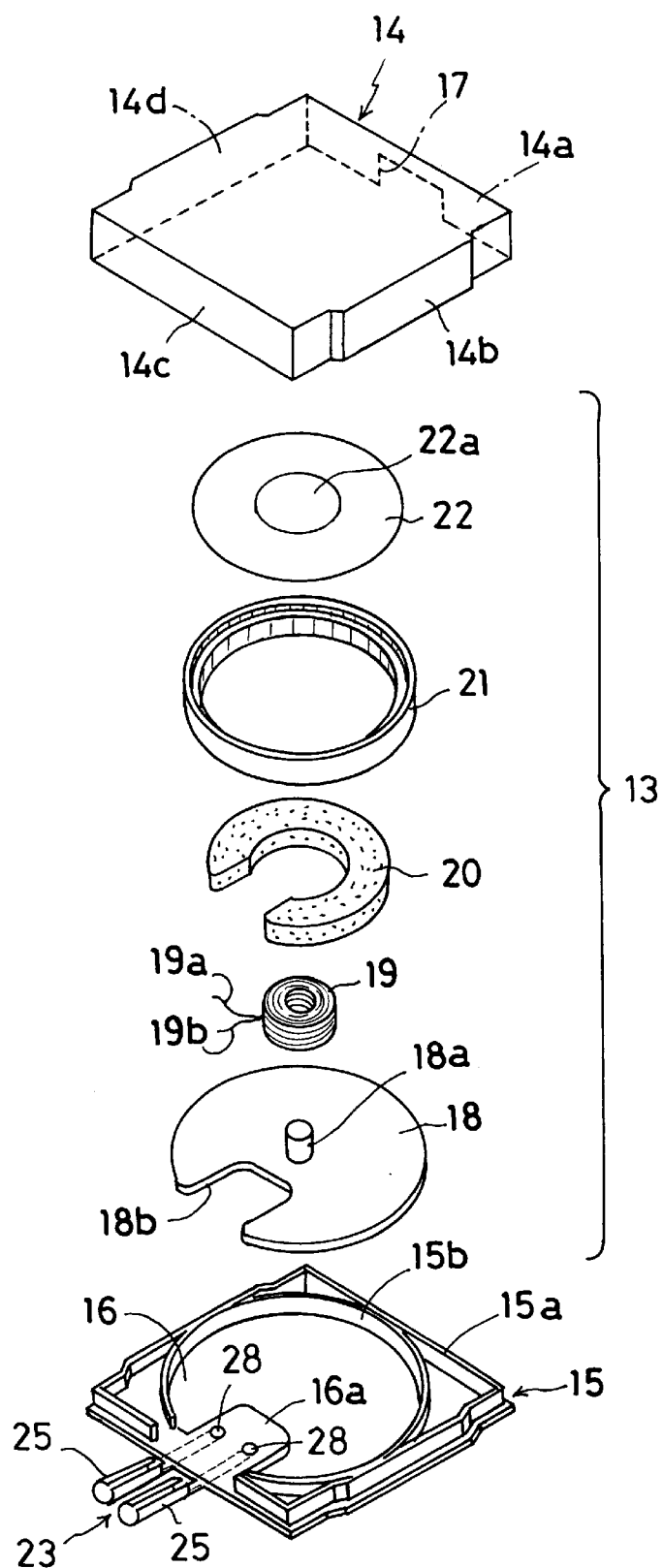
FIG. 3 is an exploded perspective view showing one embodiment of an electromagnetic sound generating body according to the present invention.
Figure 4:
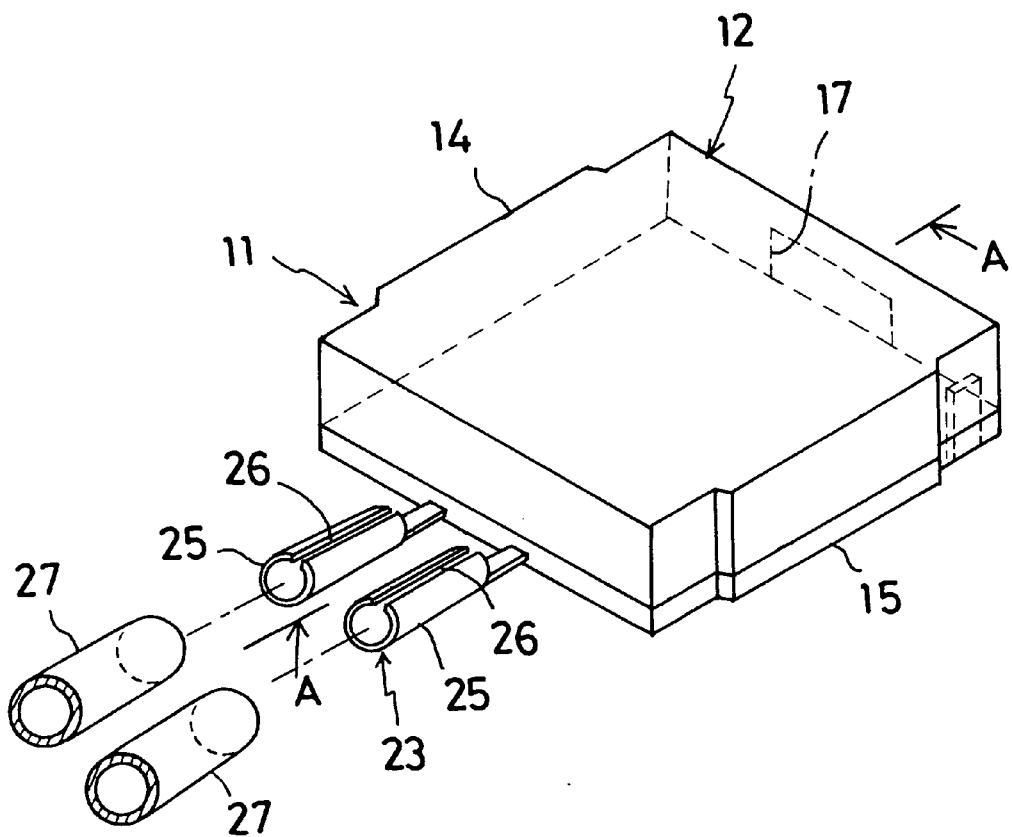
FIG. 4 is a perspective view showing the embodiment of the electromagnetic sound generating body in an assembled state.
Figure 5:
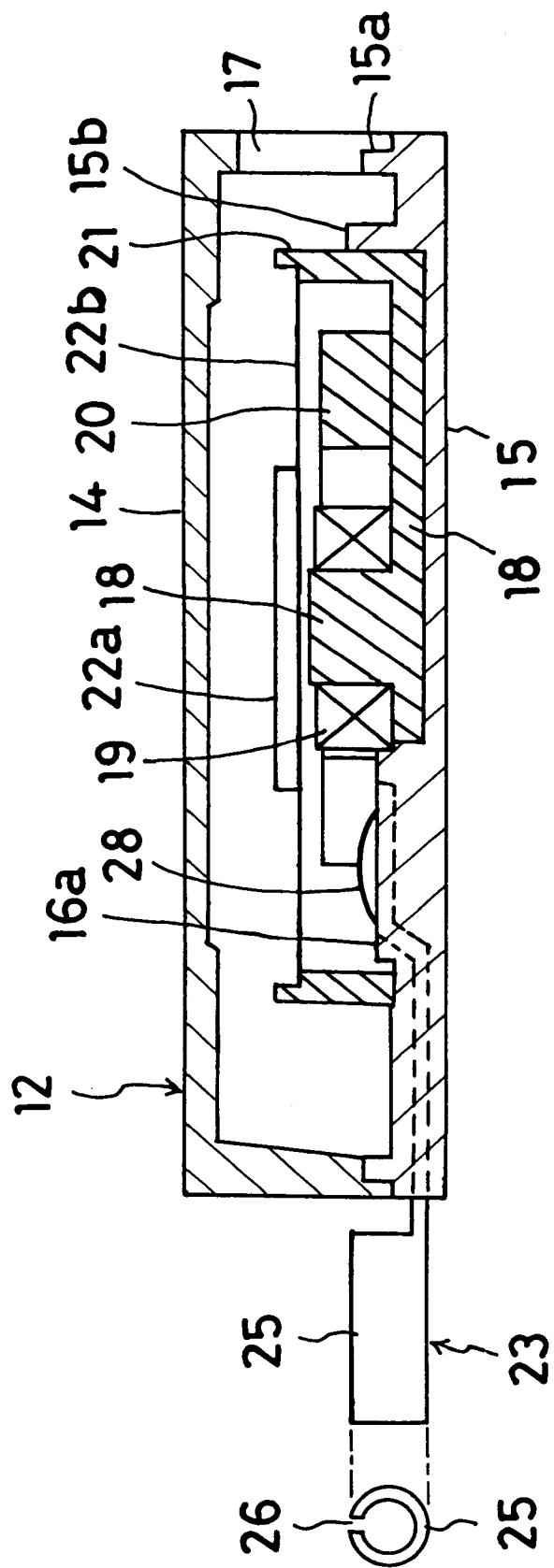
FIG. 5 is a cross section taken along the line A—A of FIG. 4 showing the inner structure of the embodiment of the electromagnetic sound generating body.
Figure 6:
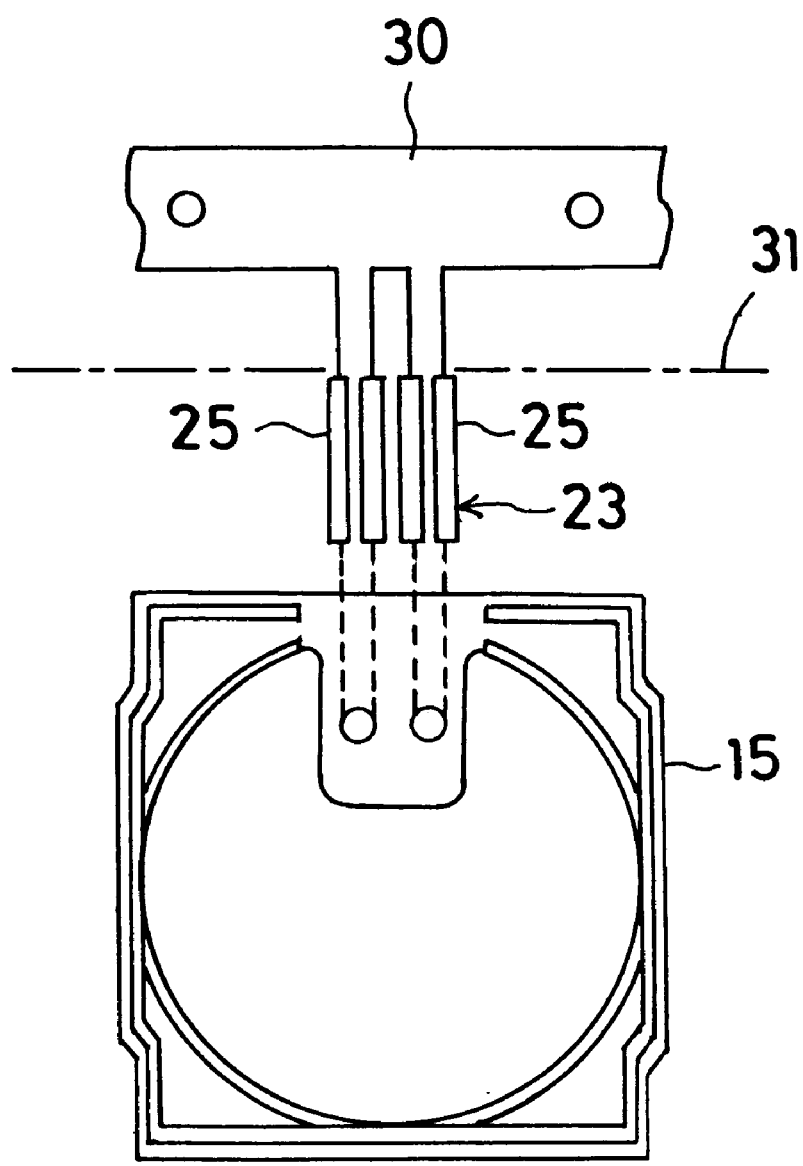
FIG. 6 is a plan view showing connector terminals being insert-molded into the embodiment of the electromagnetic sound generating body.
Figure 7:
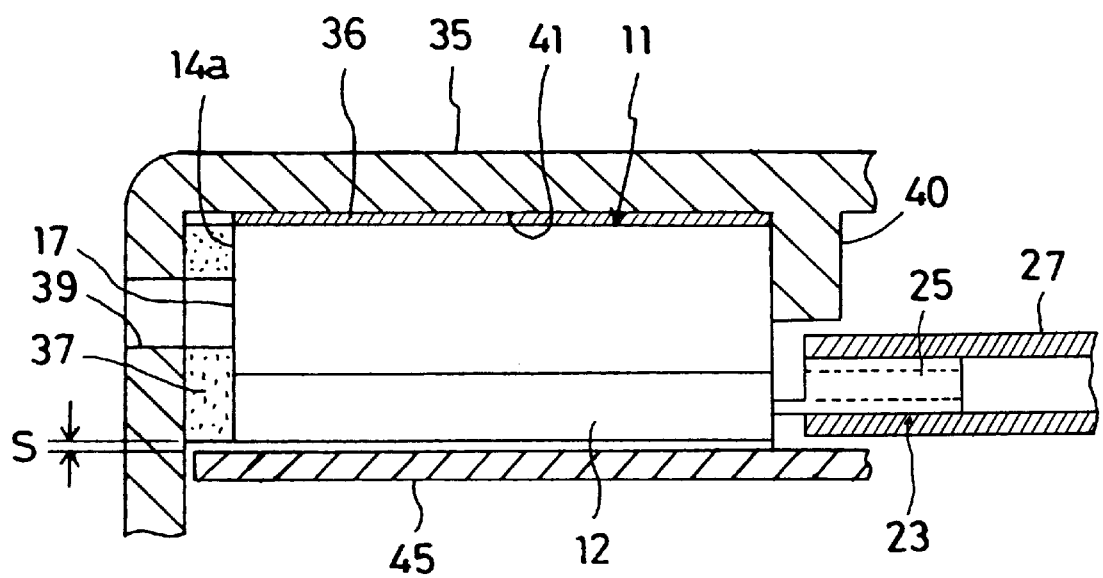
FIG. 7 is a cross section showing a means for incorporating the electromagnetic sound generating body into the exterior case.

Now, one embodiment of the electromagnetic sound generating body according to the present invention will be described in detail by referring to the accompanying drawings. FIGS. 3 to 7 represent the electromagnetic sound generating body as one embodiment of this invention. In these figures, FIG. 3 is a perspective view of the electromagnetic sound generating body when broken apart; FIG. 4 is a perspective view of the electromagnetic sound generating body in an assembled state; FIG. 5 is a cross section taken along the line A—A of FIG. 4, showing the internal structure of the electromagnetic sound generating body; FIG. 6 is a plan view showing how connector terminals are insert-molded into the electromagnetic sound generating body; and FIG. 7 is a cross section showing a means for incorporating the electromagnetic sound generating body into the exterior case.

Referring to FIGS. 3 to 5, the electromagnetic sound generating body in this embodiment is a small buzzer 11 for cellular phone that incorporates a vibratory sound generator 13 in a thin casing 12 almost square in plan view. The casing 12 has an upper resin case 14 shaped like a box and a lower resin case 15 shaped like a flat plate. The upper case 14 is placed on the lower case 15 on which the vibratory sound generator 13 is mounted, and the contacting portions of the upper and lower cases are ultrasonically welded together.

The upper case 14 has four surrounding side walls 14a, 14b, 14c, 14d, of which the front side wall 14a is formed with a sound release hole 17 of a laterally elongate rectangular shape at an almost central part thereof. The sound release hole 17 is to release an incoming call indicator tone generated by the vibratory sound generator 13 to the outside, and is formed by assembling the upper case 14 onto the lower case 15.

The lower case 15, as shown in FIG. 3, has a circumferential wall 15a formed along the circumference of the almost square flat plate, over which the side walls 14a, 14b, 14c, 14d of the upper case 14 are fitted. Formed inside and inscribed in the circumferential wall 15a is a circular wall 15b, inside of which there is a recessed area 16 to accommodate the vibratory sound generator 13. A molded portion 16a of the connector terminals 23 is projected into a part of the recessed area 16.

A pair of connector terminals 23 for external connection are formed projected in a direction opposite the sound release hole 17 and are assembled by insert molding when the lower case 15 is molded. The connector terminals 23 have at their front ends cylindrical insertion portions 25 extending horizontally straightforwardly from the end face of the lower case 15. The insertion portions 25 each have a slit 26 cut along the axis of the cylinder so that, when inserted into cylindrical female terminals 27, the insertion portions 25 do not easily come off because of the action of elastic force. The connector terminals 23 have their base portions 28 exposed from the upper surface of the molded portion 16a of the lower case 15 and connected by solder with both ends 19a, 19b of a coil 19.

The vibratory sound generator 13 comprises a flat plate 18 nearly circular in shape having a column-shaped yoke 18a at the center, a coil 19 fitted over the outer circumference of the yoke 18a, an almost C-shaped magnet 20 disposed around the coil 19, a ring-shaped support wall 21 disposed around the magnet 20, and a vibrating plate 22 mounted on the support wall 21. These are successively placed on the recessed area 16 of the lower case 15 for assembly. The vibrating plate 22 has a plate 22a mounted at the center thereof. The flat plate 18 has a notch 18b at a position corresponding to the molded portion 16a of the lower case 15.

FIG. 6 shows a lead frame 30 for insert-molding the connector terminals 23 into the lower case 15. The long lead frame 30 has a number of paired connector terminals 23 on one side. These connector terminals 23 are set on a mold frame of the lower case 15 and molded integral with the lower case 15. After being insert-molded, the lead frame 30 is cut along a cutting line 31 to separate the lower case 15 one by one. The cylindrical insertion portions 25 of the connector terminals 23 are molded in a process prior to the insert molding.

Next, the procedure for incorporating the buzzer 11 constructed as described above into the exterior case 35 of, for instance, a cellular phone will be explained. As shown in FIG. 7, the upper surface of the casing 12 is attached with a double-sided adhesive tape 36 in advance. Also, the front side wall 14a of the casing 12 is fitted with a packing 37 around the sound release hole 17 in advance. The exterior case 35 is formed with an external sound release hole 39 corresponding in size to the sound release hole 17 and also with a buzzer fixing rib 40 extending inwardly.

The process of incorporating the buzzer 11 into the exterior case 35 involves, first, removing a seal from the double-sided adhesive tape 36, fitting the buzzer 11 between the external sound release hole 39 and the rib 40, and bonding the adhesive surface of the double-sided adhesive tape 36 to an inner wall surface 41 of the exterior case 35. As a result, the buzzer 11 is securely bonded to the inner wall surface 41 of the exterior case 35, and held and positioned between the external sound release hole 39 and the rib 40, so that the sound release hole 17 of the casing 12 and the external sound release hole 39 of the exterior case 35 can be aligned coaxially at all times without any positional deviation. Further, because the packing 37 attached to the front face of the casing 12 is pressed at all times in the same condition, there is no possibility that the sound release hole 17 and the external sound release hole 39 may be deviated in position or that the sound release hole 17 may be closed by the packing 37, thus preventing the incoming call indicator tone generated by the buzzer 11 from being trapped inside the exterior case 35.

After the buzzer 11 is installed, the printed circuit board 45 is incorporated into the exterior case 35. The printed circuit board 45, though arranged close to the bottom surface of the buzzer 11, is out of contact with the latter and there is a small gap S between them. Hence, if the buzzer 11 vibrates to generate an incoming call indicator tone, the vibrations are not conveyed to the printed circuit board 45 and the electronic components and circuits mounted on the printed circuit board 45 (neither of them shown) are not adversely affected by the vibrations. Therefore, the vibrations of the buzzer 11 do not produce noise in the electronic components or circuits. As a final step, the insertion portions 25 of the connector terminals 23 projecting from the back of the casing 12 are inserted into the female terminals 27 provided on the printed circuit board 45 to make connection with external circuits.

Although the above embodiment has described the insertion portions 25 of the connector terminals 23 to be of male type, this invention can of course be applied to a case where the insertion portions are formed as a female type and the external terminals as a male type. Further, the shape of the insertion portions 25 of the connector terminals 23 is not limited to that of the above embodiment.

What is claimed is:

1. An electromagnetic sound generating body comprising:
a sound generator having a coil;

a thin casing having an upper case and a molded lower case combined together, said sound generator being disposed in said casing, said casing having a sound release hole;

connector terminals insert-molded in said lower case when said lower case is molded; wherein the connector terminals project from the casing and have front ends provided with cylindrical insertion portions for connection with external terminals, the connector terminals further having base portions for connection with the coil, the base portions being connected to the front ends, and the cylindrical insertion portions are each formed with a slit along an axis of the cylinder; and the base portions are exposed to an interior of the lower case during insert molding of the connector terminals.

2. An electromagnetic sound generating body according to claim 1, wherein the casing is attached with an adhesive member in advance and is secured to an exterior case by the adhesive member.

* * * * *